July 31, 1962 W. G. WALTERMIRE 3,047,036
KNURLED BEARING BOLT
Filed Feb. 18, 1959 2 Sheets-Sheet 1

INVENTOR.
WILLIAM G. WALTERMIRE
BY Hudson, Boughton,
Williams, David & Hoffman
ATTORNEYS July 31, 1962 W. G. WALTERMIRE 3,047,036
KNURLED BEARING BOLT
Filed Feb. 18, 1959 2 Sheets-Sheet 2

INVENTOR.
WILLIAM G. WALTERMIRE
BY Hudson Boughton,
Williams, David & Hoffmann
ATTORNEYS

3,047,036
KNURLED BEARING BOLT
William Glen Waltermire, Cleveland, Ohio, assignor to The Lamson & Sessions Company, Cleveland, Ohio, a corporation of Ohio
Filed Feb. 18, 1959, Ser. No. 794,039
6 Claims. (Cl. 151—41.73)

The present invention relates to fasteners and, more particularly, to a high tensile fastener having a bearing relationship with the host member or members for the fastener.

This application is a continuation-in-part of application Serial No. 758,767, filed September 3, 1958, now abandoned, and application Serial No. 591,610, filed June 15, 1956, now abandoned, as a continuation-in-part of application Serial No. 534,635, filed September 16, 1955, now abandoned.

Attempts have been made to provide a fastener, such as a bolt, which has a threaded portion to which a nut is applied and a shank received by the member or members of the joint being connected by the fastener, so that the shank thereof would have a bearing relationship with the host material for the fastener. In some cases, attempts were made to obtain this bearing relationship by providing the shank with knurls or projections which had interference with the receiving or host member. In these cases, however, the knurls have sheared badly and/or effected a detrimental notching of the side wall of the hole receiving the fastener and have provided little resistance to back out or turning, or the interference has either been such as to prevent the driving of the fastener into the receiving hole under commercial conditions. The notching of the receiving hole has, heretofore, resulted in a decrease in the resistance of the connection to fatigue and has adversely affected the susceptibility of the connection to low temperatures. Furthermore, the knurling has been such as to tend to seriously contribute to the burring of the bolt threads upon insertion into misaligned apertures, and such as to seriously limit the extent to which the holes can be misaligned and yet receive the bolt.

While the bearing relationship without notching can, perhaps, be obtained by accurately reaming the receiving hole or holes to the size of the fastener, this is usually unfeasible for commercial purposes.

Because of the above problems, what is commonly termed the high strength structural bolt has become the accepted fastener in the structural and related fields. This bolt is designed so that there is clearance between the shank of the bolt and the host members connected thereby and the host members are held together due to the clamping force produced by torquing the nut thereon and placing the bolt under tension which acts through friction between the connected members to prevent relative movement between the members.

One of the problems with the high strength structural bolt is that it permits slipping between the members connected by the bolt. This is due to the fact that there is no substantial bearing relationship between the shank of the bolt and the connected members and the connection relies entirely on the clamping pressure of the nut acting through the friction between the connected members to maintain the joints in their originally connected relationship. In joints where there is a short work thickness, little strain and elastic grip can be provided by the short bolt and the joint will loosen readily. Furthermore, if the coefficient of friction of the connected members is low, the high strength structural bolt may permit slipping at partial loads.

The high strength structural bolt further presents a problem because most codes will not allow paint under the head of the bolt. Paint tends to promote slipping. It is often desirable to be able to paint members before they are assembled, but if high strength bolts, or other bolts with clearance between the shank and the host members are used, masking techniques must be employed to keep the members free of paint adjacent the holes for receiving the bolts. Furthermore, when the connected joints must have good electrical conductivity, it is necessary that the shank as well as the nut and head of the bolt be in direct engagement with members of the joint since the normal clearance between the shank of a high strength structural bolt and the members of the joint provides an air space which functions as an electrical insulator.

In addition to the above problems, the high strength structural bolt, and other fasteners in the structural field, have required two men to make a connection. One man is required to insert the bolt and hold the head thereof, while the other man applies the nut to the threaded end of the bolt. Even in those applications where the conditions were such that the prior art fasteners having knurls thereon which interfered with the walk of the bolt receiving holes could be used, two men would be required, since the bearing relationship obtainable with fasteners heretofore known is not sufficient to prevent the rotation of the bolt when the nut is applied and torqued. As a result, such bolts had to be driven in before tightening the nut and with great difficulty, and the bolt held while applying the nut.

One of the principal objects of the present invention is to provide a bolt for use in structural, or similar joints, which will perform substantially as well as, or better than, the conventional high strength bolt, but which can be more readily assembled and will not be subject to slip.

Another object of the present invention is to provide a bolt for structural joints and the like which has a high bearing relationship with the host members of the joint and can be drawn or driven, such as by applying a nut and torquing the same, into position, even though the receiving holes in the joint members are somewhat misaligned.

Still another object of the present invention is to provide a bolt as in the preceding objects which has relatively high interference with the receiving members, and is constructed to cold work the metal of the receiving members, as the bolt is inserted, to an extent and in a manner such that the notching resulting from the high interference does not have an adverse effect on the joint.

A further object of the present invention is to provide a bolt for structural joints and the like which is designed to have high interference with its receiving hole and which is tapered for a substantial portion, preferably at both ends of the length of its knurled shank to facilitate its entry into misaligned holes and the aligning of the bolt after entry, the bearing relationship due to the interference providing sufficient resistance to turning while the bolt is being inserted so that the bolt may be drawn into the receiving holes and tensioned by applying a nut to the threaded end of the bolt and torquing the same without holding the head of the bolt and with little or no danger of stripping the bolt threads or cocking the bolt head.

A still further object of the present invention is to provide a bolt for structural joints and the like having knurling on its shank designed to interfere with the receiving members and which is so constructed that the bolt is able to rock to straighten itself when inserted into misaligned holes in the receiving members.

Further objects and advantages of the present invention will be apparent from the following detailed description of the preferred embodiment thereof made with reference to the drawings forming a part of this specification and in which.

Figure 10:
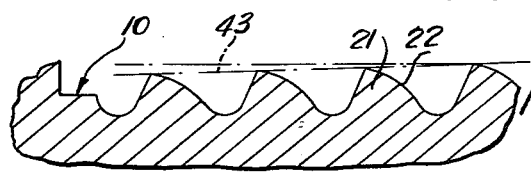

FIG. 10 also shows a modified form of a knurl projection.

In accordance with the present invention, a fastener for connecting members, such as a pair of metal plates, and having a threaded portion for receiving a nut to clamp the plates together, is provided with a shank portion that is knurled to provide radially extending projections thereon which are designed to have interference with the host members receiving the bolt when the bolt is inserted into receiving holes in the host members. The knurl projections are preferably constructed so that they cold work the metal surrounding the hole into which the bolt is inserted as the bolt is driven or drawn into the hole and the construction is such as to permit the fastener to be inserted in spite of the relatively high interference and without effecting a detrimental shearing of the projections, and so that the fastener after insertion has a high resistance to turning and back out. In the preferred embodiment, the projections converge radially outwardly of the body of the fastener and are provided with a convexly curved entry face which faces axially in the direction of entry movement into the receiving hole and which has a relatively narrow portion adjacent the high place or point of the knurl projection and extends forwardly and downwardly from the high point with the portion adjacent the base thereof being relatively wide as compared to the portion adjacent the top or high place of the knurl. The knurl projections each have a trailing face, in the preferred embodiment, which is inclined forwardly from the body of the fastener, and side faces which are, preferably, convexly curved.

To facilitate the insertion of the fastener, the entry end of the knurled portion is tapered from a relatively small outside diameter adjacent the entry end to a maximum outside diameter at the central portion of the shank. Preferably, the entry taper extends for approximately one-third of the knurled portion. With a tapered entry end, the initial interference of the knurls in normal grip thickness is such that the fastener can be readily inserted to a point where a nut can be applied to the threaded end of the fastener to draw the bolt into its receiving holes. Often, the receiving holes of the host members are misaligned, and the entry taper facilitates the insertion into such holes. When a bolt is inserted in misaligned holes, it may cock, which is an undesirable condition in which to leave the bolt. In accordance with one feature of the invention, the trailing part of the knurled portion is also provided with a taper. This trailing taper extends from a diameter slightly smaller than that of the hole at the trailing end of the knurled portion forwardly and outwardly to the intermediate part having the maximum outside diameter. The trailing taper may be shorter than the entry taper and the intermediate part of the maximum outside diameter may be displaced axially rearwardly of the midpoint of the knurled portion. When the bolt is drawn or inserted into misaligned holes, the compound taper thereon will allow it to rock in its receiving aperture and to straighten itself so that the fastener will be perpendicular to the receiving members. Although providing the bolt with a compound taper decreases the interference between the bolt and its host members, the knurl projections described herein have sufficient holding power and bearing relationship to achieve the aforementioned objects even though the knurled portion is tapered in the manner set forth.

Furthermore, the knurled portion of the fastener, which preferably has a length approximately equal to the thickness of the members connected thereby has a portion of maximum outside diameter intermediate its ends with its outside diameter decreasing proceeding from the portion having maximum outside diameter toward either end. Preferably, the knurled portion has a taper which extends rearwardly and outwardly from the entry end of the knurled portion for, preferably, approximately one-third the length of that portion of the fastener received by the members connected by the fastener. The knurled portion may be described as barrel-shaped and this shape facilitates the insertion of the fastener into misaligned holes of a pair of members to be connected by the bolt.

The knurl projections described above are preferably formed by rolling, and inclined rear faces of the preferred knurl projections provide relief to prevent packing of the material and, in addition, the projections are preferably arranged in helical, axially extending rows with the projections of each row being spaced. The helical rows of knurls produce helical grooves having rounded bottoms in the side walls of the receiving openings. The round bottoms are produced because the knurls cause the bolt to turn as it is inserted and the turning causes the curved frontal sections of the elements of each helical row to generate a rounded groove bottom. The cold working of the material around the receiving opening is accomplished to such an extent that the resultant joint is not subject to a decrease in resistance to fatigue because of the notching of the side walls of the receiving hole. Furthermore, the fastener after being inserted even partially into the receiving opening, has such high resistance to back out and turning that the fastener can actually be drawn into the opening by turning a nut applied to the threaded end thereof without holding the fastener against rotation. In fact, the fastener can be tensioned by torquing the nut and without holding the fastener.

Figure 1:
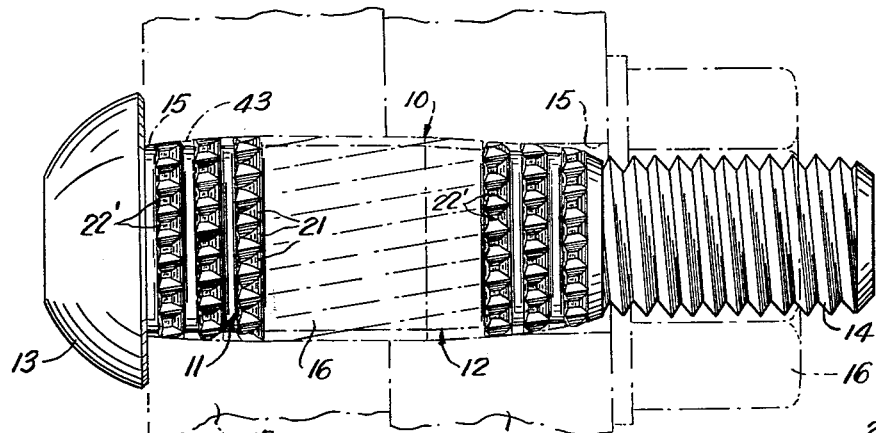
FIG. 1 is an elevational view of a bolt embodying the present invention and illustrating the use of the bolt to connect plate members shown in dot-dash lines.

As one practical embodiment of this invention, FIG. 1 of the drawing shows a headed member or bolt 10 having interfering projections or knurling 11 thereon. The bolt 10 is here shown as being of the above-mentioned bearing bolt type and comprises a stem 12 having a head 13 at one end thereof and a threaded portion 14 at its other end. The knurling 11 is carried by the intermediate portion or shank 16 of the stem 12 and extends therealong for a desired distance, in this case the knurling being shown as extending for substantially the full distance between the head 13 and the threaded portion 14.

FIG. 1 of the drawing illustrates one use of the knurled bolt 10 and in this use the bolt extends through bolt holes 15 provided in a pair of plate members 17 and 18 and clampingly holds the plate members between the head 13 and a nut 19 applied to the threaded stem portion 14. The knurled shank 16 of the stem 12 is here shown as being of substantially the same axial length as the combined bolt holes 15. The knurling 11 products a desired strong connection between the bolt and the plate members 17 and 18 when the bolt is driven or drawn into the bolt hole 15, such that the bolt will be held against rotational and back-out movements relative to the bolt hole.

The knurling 11 preferably comprises coextending axial rows of knurl projections or elements 21 which are formed or swaged solid segments of the metal of the stem of the bolt 10. The knurl elements 21 can be formed on the shank of the stem 12 by any suitable method of operation and tools, such as by a rolling operation between cooperating knurling dies, during which the elements are swaged or generated on the stem. After the knurl elements 21 and the thread 14 have been formed on the stem 12, the bolt 10 may be suitably hardened by any appropriate known hardening procedure.

The described knurl elements 21 are of the type disclosed in my copending applications S.N. 758,767 and S.N. 534,635 and extend along the shank of the stem 12 in the general direction of the longitudinal axis thereof and converge radially outwardly from a base 21a at the shank of the bolt to an apex or place of maximum height adjacent the trailing end of the projection and have frontal sections or tops 22 thereof sloped or tapered from the apex to a minimum height at the other end, such that each knurl element has a relatively low entry end 23 leading the knurl projection when moved in the direction of the axial movement of the knurled portion when the latter is being drawn or driven into the opening of the associated part, and a realtively high trailing or buttress end portion 24 facing in the opposite axial direction and which cooperates with the wall of the opening for resisting turning and back-out movements, as will be further explained hereinafter. The base 21a of each knurl element is of substantially rectangular configuration and has, therefore, a substantially uniform width throughout its length.

Figure 2:
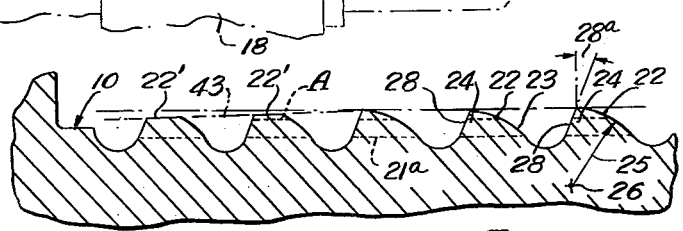
FIG. 2 is a sectional view taken along the crestline of the knurl elements of the bolt in FIG. 1.

The knurl elements 21 are formed with the sloping tops 22 thereof convexly curved for a substantial or major portion of their full length, as is shown in FIG. 2 of the drawings. The curved tops 22 provide convexly curved entry faces or frontal sections facing in the forward direction. This convex curvature can be of a suitable radius and is important in that it facilitates the movement of the knurled portion of the article into the opening of the associated part. The center 26 of the radius line 25 of the curved top 22 lies on the axis of the bolt at an intermediate point of the length of the knurl element 21 and is preferably located relatively closer to the buttress end portion 24. In the preferred form, the curvature of the tops or faces 22 is such that the faces approach the portion or apex of the knurl element in a generally tangential relationship with respect to the high portion so that the entry end will be generally tangential with the side wall of the receiving opening for the knurled bolt when the latter is inserted therein. The tops 22 of the knurl elements, in addition to being curved, are, when viewed in plan, relatively narrow at their ends adjacent the high point and relatively wide at their forward ends adjacent the base of the projections and may include a flat 22' at the narrow end thereof.

Figures 3, 9:
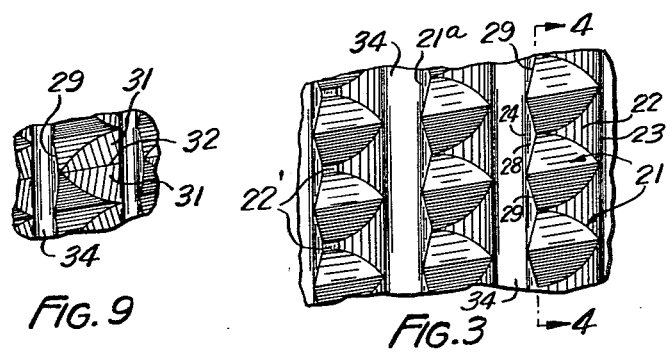
FIG. 3 is an enlarged plan view of a portion of the bolt part in FIG. 1.
FIG. 9 is a fragmentary sectional view showing a modified form of knurling.
Figure 4:
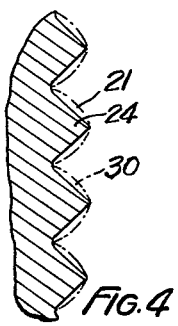
FIG. 4 is a sectional view taken along line 4—4 of FIG. 3.

The buttress end portion 24 of the knurl element 21 has an upright, relatively inclined transverse end wall 28. The end walls 28 of all of the knurl elements 21 of a given row of such elements face in the same axial direction and the perimeter of the end wall defines an edge 29 on each knurl element. The inclination of the end wall 28, as represented by the angle 28a of FIG. 2, is here shown as being approximately 15° but can be varied and can be either a larger or smaller angle if desired. The exposed edge 29 extends transversely of the knurl element, as shown in FIG. 3, and follows the shape of the buttress portion 24, which may be substantially triangular as shown in solid lines in FIG. 4, or which may have arched sides as shown in dot-dash lines in FIG. 4 and as shown in FIG. 9. The arched sides in FIG. 4 have been designated by the reference numeral 30.

From the shape of the knurl element 21 as thus far described, it will be seen that this knurl element is a sloping solid segment having a truncated relatively high end at the rear or trailing end thereof and providing a rearwardly facing inclined end wall 28, and also having a forwardly and downwardly sloping entry portion or lead end providing a convexly curved entry face, narrow at the apex as compared to its width at the base. If desired, the top or entry face 22 of each knurl element may be formed with side portions 31 which intersect along the longitudinal center line of the element and define a longitudinal apex ridge 32. As shown in FIG. 9, this apex ridge extends axially along each knurl element for substantially its full length, that is to say, from the high midpoint of the transversely arched shearing edge 29 of a given knurl element to the lower edge or base at the forward end of the element.

One of the dominant characteristics of the individual knurl elements 21 is considered to be the convexly curved entry face and the transverse shearing edge 29, together with the inclined end face 28. As has already been indicated above, the convexly curved entry face or top of the knurl elements facilitates the entry of the knurled portion into the opening of the associated part when the knurled article is being driven thereinto. When inserted, the knurl element is indented into the internal wall of the opening during the driving of the knurled portion thereinto, such as to form a strong interlock between the knurled portion and the associated part for preventing relative turning therebetween. The exposed shearing edge 29 becomes pressed against, or indented into, the internal wall of the opening during the driving of the knurled portion thereinto and, because of its rearwardly facing direction on the knurled portion, it strongly resists back-out movement of the knurled portion relative to the opening.

Another characteristic of the knurling 11 is that the knurl projection, because of its shape and relatively large shear area adjacent its outermost end, strongly resists shearing as the knurled shank is driven or drawn into the receiving member, and both the elastic and plastic distortion of the knurl elements 21 will occur during the driving. Although some shearing of the knurl elements may result from the driving, the construction is such as will provide minimum dramage to the knurl elements and such distortion of the elements as does actually occur will contribute to the holding power of the knurling in the opening of the associated part. Thus, when the metal of the knurling is harder than the metal of the associated part, the rigid tops of the knurl elements will indent into the internal wall of the associated part and the distortion of the knurl elements will consist mainly of an elastic distortion, such that the tendency for the metal of the knurl elements will be to spring back to its original shape and condition, thereby pressing the tops of the knurl elements firmly against the associated part.

When the metal of the associated part into which the knurled portion is driven is as hard as or harder than the knurled article, the deformation of the knurl elements 21 will consist, at least to some extent, of a plastic deformation. This plastic deformation occurs while the knurled portion is being driven into the opening and causes portions of the tops of the knurl elements 21 to be forcibly pushed or swaged rearwardly, such that the shearing edge 29 more or less overhangs the end wall 28 to constitute a hooklike portion or overhang. The creation of this hooklike characteristic on the buttress portion 24 occurs at the same time that the top of the knurl element is being pressed against and indented into the internal wall of the associated part, such that the hooklike portion will produce a strong interlock with the associated part and will resist back-out movement of the knurled portion.

The resistance of the disclosed knurl projections to shear will be appreciated when it is noted that the knurl projections, because of the curved top, have a relatively large shear area adjacent their apexes. The dotted line A in FIG. 2 indicates the designed line of interference of the side wall of the receiving opening with the knurl projections and it will be noted that the shear area of the knurl is not seriously affected if this line is shifted radially outwardly or inwardly.

Therefore, the proper operation of knurling is not dependent on exact hole sizing, and the bolt 10, therefore, is less sensitive to hole sizing than bolts of the same type having other types of knurling thereon.

The resistance of the knurl elements to shearing is also aided by the inclined rear walls 28. These walls may be said to function as buttresses for the knurl elements.

It has been found that knurl elements of the type disclosed when on the shank of fastener or bolt effect a cold working of the host material, when designed to interfere therewith and of the proper hardness, as the fastener or bolt is inserted, which cold working overcomes any decrease in resistance to fatigue which might be caused by the notching of the host material, i.e., the members 17, 18. This is true in spite of the fact that the notching is in a direction normally considered most detrimental to the connection. Furthermore, the notching does not render the joint susceptible to fatigue at low temperatures as would otherwise normally be expected.

Figure 5:
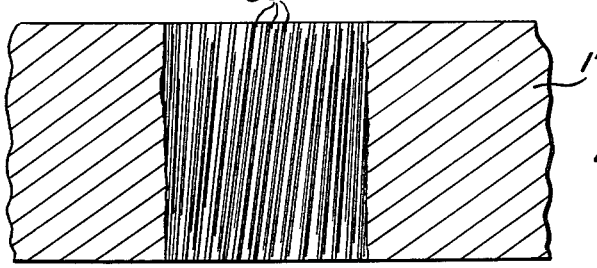
FIG. 5 is a sectional view of a plate after the knurled shank of the bolt of FIG. 1 has been inserted into a hole therein.

As shown in FIG. 1, the rows of the knurl elements 21 are disposed so as to extend helically along the stem 12 at a suitable pitch angle with the elements of each row spaced from each other by a groove as indicated at 34. In the drawing, the pitch angle of the rows is shown as being 10° but this can be varied as desired or to suit the requirements of the products under consideration. The helical arrangement of the rows of the knurling 11 is important because it provides for a turning of the bolt as it is driven or drawn into the receiving or host member. Thus, during the driving or drawing of the knurled portion into the opening of the associated part, the rows of elements will displace the host material to form grooves which will have rounded bottoms. The rounded bottoms are provided because the curved entry faces are rotated about the bolt axis as the bolt is inserted. FIG. 5 shows a section of plate 17 which illustrates the grooving effect of the knurls on the bolt of FIG. 1. As can be seen from FIG. 5, the grooves, designated by the reference numeral 33, formed by the knurling have a lead thereto because of the turning of the bolt and have rounded bottoms. The helical arrangement of the knurls also increases the resistance of the bolt to axial push-out forces since each element when urged in an axial direction tends to cut an individual path. The knurl helix lead is also such that the bolt rotates in the same direction that a nut is rotated to thread it onto the bolt. The forces torquing the nut then act through the helical knurling to pull in the bolt. The turning of the bolt also aids in overcoming the resistance to the insertion of the bolt.

The dimensions and proportions of the individual knurl elements 21, as well as the spacing of the adjacent rows of those elements, can be varied as desired in the knurled article to suit the size, hardness, and other characteristics of the knurled article and of the associated part with which it is to be used.

Figure 6:
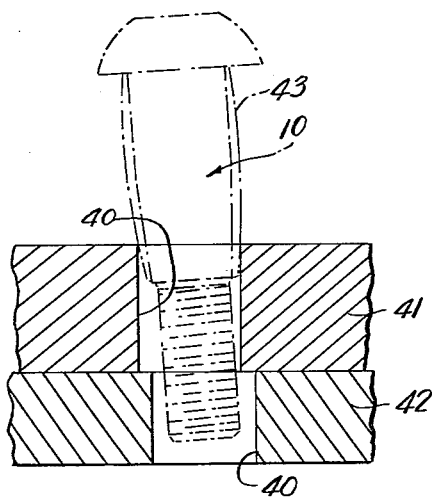
FIGS. 6 and 7 illustrate the steps of inserting the bolt of FIG. 8 in misaligned holes in a pair of plates to be connected.

The outside diameter of the knurled shank of the bolt 10 is in accordance with the present invention tapered for a substantial part of the length thereof from a point intermediate the ends of the knurled shank to a smaller knurled shank diameter adjacent the threaded portion of the fastener to provide a leading taper; preferably, the leading taper is about one-third the length of the knurled shank. This leading taper is indicated by angle 35 in FIG. 1. The taper is provided primarily to facilitate the insertion of the bolt 10 into receiving holes in the members 17, 18 particularly when the holes are misaligned, as in FIG. 6. In FIG. 6, the outside periphery of the knurled portion is indicated by dotted lines 36.

Figure 7:
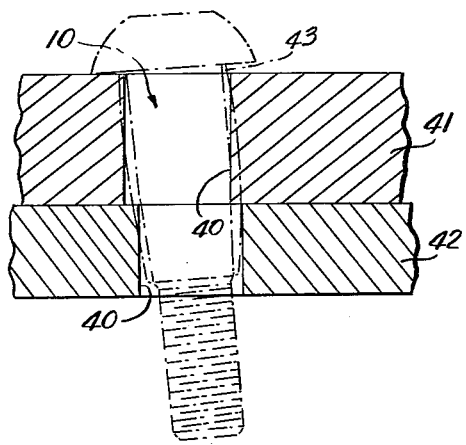
Figure 8:
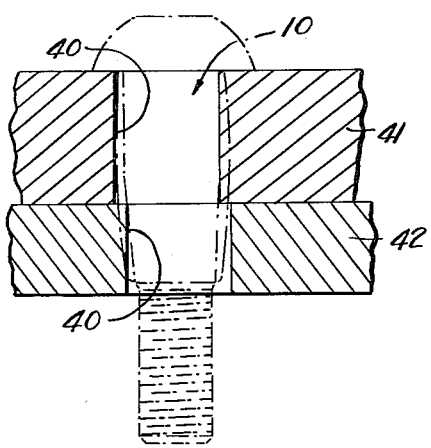

The outside diameter of the knurled shank also progressively decreases proceeding rearwardly from the central part having the maximum outside diameter. The trailing taper provides clearance or relief which facilitates the rocking of a cocked bolt in misaligned receiving holes to effect the straightening of the bolt. FIGS. 6, 7 and 8 illustrate the insertion of the bolt in misaligned holes 40 in plates 41, 42 to be connected by the bolt. The outline of the outside diameter of the knurling is indicated diagrammatically in FIGS. 6, 7 and 8, and the trailing taper line has been designated by the reference numeral 43 and is clearly shown in FIG. 2 as inclined with respect to the line of maximum knurl diameter that extends parallel to the bolt axis, the view of FIG. 2 being a sectional view taken along the crestline of an axially extending row of knurl projections.

As can be seen by reference to FIG. 6, the leading taper on the knurled shank of the bolt will allow the leading end of the bolt to be inserted to such an extent that the leading end of the bolt is beyond the shoulder provided by the misaligned holes for many holes where this would not be possible without the taper. In the absence of a leading taper, the knurled portion tends to immediately center the bolt in the hole of the first member 41 and does not facilitate its cocking to allow the entry end to pass beyond the shoulder caused by misalignment of the holes in members 41 and 42. Furthermore, in the absence of a leading taper, the forces tending to straighten the bolt as it enters and goes through member 42 are such to cause an extreme burring of the threads when the bolt is driven or pulled home even though the misalignment is such as to permit the leading end to be inserted to a point beyond the entry ply 41 before the knurled portion engages the entry ply and rights the bolt. It can be seen, therefore, that the entry taper facilitates the use of a bolt with holes having a misalignment which would in practice preclude the use of a bolt having a knurled shank designed to interfere the same amount for the entire shank length with the host members and not having an entry taper thereon as it would require excessive and costly reaming or drifting of the holes. Furthermore, the forces required to right the bolt due to the driving or drawing of the bolt into the aperture are not as great with an entry taper and the burring of the threads when the bolt is inserted into misaligned holes is minimized.

It is important, when the bolt has been driven or drawn home, that the bolt be straight, i.e., its axis perpendicular to the plates. The trailing taper on the knurled shank facilitates the rocking of the bolt to a straightened position. FIG. 7 shows the bolt inserted to a point where the head is in engagement with the entry ply and illustrates the cocked position which the bolt has assumed during the initial steps of insertion to allow the threaded portion thereof to clear the shoulder provided by the misaligned holes in the plates 41, 42 and because of the forces set up during insertion, while FIG. 8 shows the bolt after it has rocked to a straightened position. It will be noted that during the rocking movement, the knurls on those portions of the bolt which may be considered as leading the bolt in its rocking movement tend to embed themselves by moving sideways into the side wall of the receiving hole. Under these conditions the knurls can be said to have a movement which includes a sideways component as well as an axial component.

The trailing taper of the knurled shank may be provided by allowing underfilling of the rolling dies and the knurl projections, particularly along the trailing taper, may have flats, as shown in FIGS. 2 and 3 and designated by the reference numeral 22', due to the underfilling of the dies. The entry end 23 of each projection will, however, be a radius curve that extends from the flat to the base of the projection as is evident from FIG. 2 and if extended, approaches the line of maximum knurl diameter in a generally tangential manner. The trailing and entry tapers may be cut in the rolling dies and if this is done, the knurl elements on the tapers will, in forming or swaging the bolt, be filled out and have substantially the same formation as those on the part of maximum diameter. The knurl elements of the trailing taper of such a fastener are shown in section in FIG. 10. It will be noted from FIG. 1 that the knurl elements on the leading taper may also have flats due to underfilling of the dies.

While the tapering of the outside diameter of the knurled portion in the manner described decreases the amount of interference between the host member and shank of the bolt, knurl projections as described herein provide sufficient holding and bearing to resist back out and turning sufficiently enough to enable the nut on the bolt to be torqued without holding the head of the bolt. This is particularly important where the bolt is a headless bolt which has no head to hold.

A bolt as described is particularly useful for connecting metal plates in structural applications, and a bolt in this type of application is preferably a high carbon bolt so that the material of the knurl projections is relatively hard as compared to the material of the plate to be connected and effects a cold working thereof as the bolts are inserted into their receiving holes. It will be understood, however, that if the bolt is used in applications where the cold-working effect is not desired, the particular configuration of the knurl elements will have the advantage of minimizing the sensitivity of the bolt to the diameter of the hole size and will reduce the force necessary to insert the bolt into the material for a given amount of interference.

While the preferred forms of the present invention have been described in considerable detail, further modifications, constructions and arrangements will fall within the ability of those skilled in the art and it is hereby my intention to cover all such constructions, modifications and arrangements which fall within the ability of those skilled in the art and within the scope and spirit of the present invention.

Having thuse described my invention, I claim:

1. A bolt for connecting a pair of host members having holes for receiving the bolt, said bolt having a shank which is to be received in the holes, a threaded portion disposed adjacent and forwardly of said shank to extend outwardly of the holes in said host members to receive a nut to apply a clamping presure to said host members, a head at the end of said shank remote from said threaded portion, said shank having a diameter approximately equal to but less than the inside diameter of the receiving holes and the plurality of knurl projections thereon extending radially therefrom to interfere with the material of the host members adjacent said holes, said projections being arranged in a plurality of rows extending about the periphery of said shank with the rows being spaced from each other and each of said projections being a pressure-formed integral projection having a pyramidal shape converging radially outwardly of said shank from a base lying at the junction of the projection with said shank and including a forwardly inclined rear face and a top comprising an apex and an axially extending entry portion extending forwardly and downwardly from the apex along a convex curvature from a point of maximum radial height at the apex to a point of minimum radial height at the forward end of said base to provide a convexly curved entry face which leads the projection into the holes in the host members, said apex of each of said projections being located at an intermediate point of the axial length of the projection with the intermediate point being displaced from the entry end of the projection and the entry face of the projection extending for a substantial portion of the axial length of the projection and when the projection is viewed in plan having a narrow portion adjacent the apex thereof and a portion of maximum width adjacent the forward end of the base thereof and the base of each projection being of substantially uniform width substantially throughout its axial length and the projections of each of said rows being arranged with respect to the projections of the other of said rows to define helical rows extending axially of said shank and the first-mentioned rows of projections lying in planes generally transverse to the axis of the bolt with the projections on the bolt extending outwardly of the shank to a maximum outside diameter at an intermediate portion of the shank and the projections proceeding progressively to either end of the shank from the intermediate portion extending outwardly of the shank to progressively smaller outside diameters.

2. A bolt for connecting a pair of host members having holes for receiving the bolt, said bolt having a shank which is to be received in the holes, a threaded portion disposed adjacent and forwardly of said shank to extend outwardly of the holes in said host members to receive a nut to apply a clamping pressure to said host members, a head at the end of said shank remote from said threaded portion, said shank having a diameter approximately equal to but less than the inside diameter of the receiving holes and the plurality of knurl projections thereon extending radially therefrom to interfere with the material of the host members adjacent said holes, said projections being arranged in a plurality of rows extending about the periphery of said shank with the rows being spaced from each other and each of said projections being a pressure-formed integral projection having a pyramidal shape converging radially outwardly of said shank from a base lying at the junction of the projection with said shank and including a forwardly inclined rear face and a top comprising an apex and an axially extending entry portion extending forwardly and downwardly from the apex along a convex curvature from a point of maximum radial height at the apex to a point of minimum radial height at the forward end of said base to provide a convexly curved entry face which leads the projection into the holes in the host members and which extends generally transversely of the bolt, said apex of each of said projections being located at an intermediate point of the axial length of the projection with the intermediate point being displaced from the entry end of the projection and the entry face when the projection is viewed in plan having a narrow portion at the end thereof adjacent the apex and a portion of maximum width at the forward end thereof adjacent the forward end of the base and the base of each projection being of substantially uniform width substantially throughout its axial length and the projections of each of said rows being arranged with respect to the projections of the other of said rows to define second rows extending axially of said shank with the first-mentioned rows of projections being angularly related to the second rows and with the projections on the bolt extending outwardly of the shank to a maximum outside diameter at an intermediate portion of the shank and the projections proceeding progressively to either end of the shank from the intermediate portion extending outwardly of the shank to progressively smaller outside diameters.

3. A bolt as defined in claim 2 wherein said projections each have axially extending sides and the entry face thereof extends transversely of the said sides and intersects the respective sides along lines defining marginal edges of said entry face and edges of said projections.

4. A fastener for connecting a host member having a hole therein for receiving the fastener and another member, said fastener having a shank which is adapted to be received in the hole by forward endwise movement of the fastener and a portion disposed adjacent and forwardly of said shank to extend outwardly of said host member, said shank having an unknurled diameter approximately equal to but less than the inside diameter of the receiving hole and knurling thereon comprising a plurality of pressure-formed knurl projections extending radially from the shank to interfere with the material of the host member adjacent said hole, said projections being arranged in a plurality of rows extending around the knurled shank with the rows being disposed axially from each other and each of said projections being a pressure-formed integral projection having a pyramidal shape with a quadrilateral base lying at the juncture of the projection with said shank and converging radially outwardly of said shank from the base toward an apex point and including convexly curved sides extending lengthwise of said shank and curved in a plane transverse to the shank and a forwardly inclined rear face and a top comprising a high part and an axially extending entry portion extending forwardly and downwardly from the high part along a convex curvature from a point of maximum radial height at the high part to a point of minimum radial height at the forward end of said base to provide a convexly curved entry face which leads the projection into the hole in the host member and which extends generally transversely of the shank axis and of said convexly curved sides, said apex of each of said projections being located at an intermediate point of the axial length of the projection and the entry face of the projection extending for a substantial portion of the axial length and when the projection is viewed in plan having a narrow portion adjacent the high part thereof and a portion of maximum width at the forward end of the entry face adjacent the forward end of the base, and the projections of each of said rows being arranged with respect to the projections of the other of said rows to define second rows extending axially of the shank, said apex of each of said projections being disposed between the trailing face of the knurl projection and the midpoint of the axial extent of the knurl projection and being displaced a substantial distance from the midpoint toward the trailing face.

5. A fastener as defined in claim 4 wherein the projections in each of said rows extending around the shank are contained in radial planes of said shank and are separated from the adjacent rows extending around the shank by an indented groove.

6. A fastener as defined in claim 4 wherein the bases of said projections are substantially parallelograms in configuration and have a dimension extending lengthwise of the shank substantially at least as great as the dimension of the bases between the sides of the projection extending lengthwise of the shank.

References Cited in the file of this patent

UNITED STATES PATENTS

| | | |
|---|---|---|
| D. 34,691 | Monroe | June 25, 1901 |
| 1,966,835 | Stites | July 17, 1934 |
| 1,978,145 | Rosenberg | Oct. 23, 1934 |
| 2,056,309 | Osenberg | Oct. 6, 1936 |
| 2,095,153 | Rosenberg | Oct. 5, 1937 |
| 2,183,243 | Meersteiner | Dec. 12, 1939 |
| 2,196,144 | Eckler | Apr. 2, 1940 |
| 2,269,708 | Dickson | Jan. 13, 1942 |

FOREIGN PATENTS

| | | |
|---|---|---|
| 12,857 of 1901 | Great Britain | June 24, 1901 |
| 268,521 | Great Britain | Apr. 7, 1927 |